US006403907B1

(12) United States Patent
Tanimoto

(10) Patent No.: US 6,403,907 B1
(45) Date of Patent: Jun. 11, 2002

(54) ARTICLE DIMENSION MEASURING APPARATUS

(75) Inventor: Michiaki Tanimoto, Takasago (JP)

(73) Assignee: Yamato Scale Company, Limited (JP)

( * ) Notice: Subject to any disclaimer, the term of this patent is extended or adjusted under 35 U.S.C. 154(b) by 0 days.

(21) Appl. No.: 09/627,890

(22) Filed: Jul. 28, 2000

(30) Foreign Application Priority Data

Jul. 30, 1999 (JP) .......................................... 11-217884

(51) Int. Cl.[7] ............................ B07C 5/04; G01B 11/02

(52) U.S. Cl. ........................ 209/586; 209/938; 356/358; 356/376

(58) Field of Search ................................ 209/576, 577, 209/586, 938; 356/355, 356, 357, 358, 372, 376; 73/655, 656; 367/118, 127, 128

(56) References Cited

U.S. PATENT DOCUMENTS 5,606,534 A * 2/1997 Stringer et al. ............. 367/128
5,850,370 A * 12/1998 Stringer et al. ............. 367/128

FOREIGN PATENT DOCUMENTS

JP HEI 6-78887 B2 6/1991

* cited by examiner

*Primary Examiner*—Tuan N. Nguyen
(74) *Attorney, Agent, or Firm*—Senniger, Powers, Leavitt & Roedel

(57) ABSTRACT

An article classifying system includes a conveyor 9 for conveying mail pieces 1, a weighing conveyor 18, and a sorting conveyor 26. A length measuring unit 5 measures the length of the mail pieces while they are being conveyed by the conveyor 9. Also, the width and the thickness of the mail pieces are measured by a width measuring unit 4 and a thickness measuring unit 3. The weight of the mail pieces is measured by a weighing unit 6 while the mail pieces are being conveyed on the weighing conveyor 18. Then, a control unit classifies the mail pieces into categories according to their length, width, thickness and weight.

14 Claims, 7 Drawing Sheets

| CATEGORY | SIZE | WEIGHT |
|---|---|---|
| 1 | Standard Mail : L: 14cm - 23.5cm, Xw: 9cm - 12 cm, H: Not Greater Than 1cm | 25 g or Less |
| 2 | | 50 g or Less |
| 3 | Nonstandard Mail: Size Other Than That of Standard Mail | 50 g or Less |
| 4 | Nonstandard Mail: Weight Greater Than 50 g, Regardless of Size | 75 g or Less |
| 5 | | 100 g or Less |
| 6 | | 150 g or Less |
| 7 | | 200 g or Less |
| 8 | | 250 g or Less |
| 9 | | 500 g or Less |
| 10 | | Greater Than 500 g |

FIG.7

| DATE | ADDRESSEE | | ADDRESS 1 | ADDRESS 2 | CATEGORY | HANDLING | CHARGE |
|---|---|---|---|---|---|---|---|
| | DEPARTMENT | COMPANY | | | | | |
| 1999/07/01 | Sales | ABC Corp. | 1-3 Ogawa-cho, Minato-ku, Tokyo | ABC Bldg. 28F | Standard | | ¥80 |
| 1999/07/01 | Sales | ICON Co., Ltd. | 1 Naka-machi, Suma-ku, Kobe | | Standard | Special Delivery | ¥350 |
| 1999/07/01 | Account | TOKYO Inc. | 4-23 Harada, Koto-ku, Tokyo | Koto Bldg. 16F | Nonstandard | Special Delivery | ¥520 |
| 1999/07/01 | General Affairs | JAPAN Co. Ltd. | 2-2 Nipponbashi, Chuo-ku, Tokyo | | Parcel | | ¥870 |
| 1999/07/03 | Sales | ABC Corp. | 1-3 Ogawa-cho, Minato-ku, Tokyo | ABC Bldg. 28F | Nonstandard | | ¥390 |
| 1999/07/03 | General Affairs | OSAKA Inc. | 6-5 Ueda, Kita-ku, Osaka | Osaka Bldg. 1F | Post Card | | ¥50 |
| 1999/07/03 | System | XYZ Co., Ltd. | 12-4 Inari-cho, Tsu-shi | | Standard | | ¥80 |
| 1999/07/04 | Sales | ICON Co., Ltd. | 1 Naka-machi, Suma-ku, Kobe | | Standard | Registered | ¥500 |

FIG.8

ARTICLE DIMENSION MEASURING APPARATUS

This invention relates to an article classifying system for automatically measuring the width, length, thickness and weight of articles, e.g. pieces of mail, and comparing the measurements with preset values for various categories of mail to classify the mail pieces. This invention also relates to an apparatus for measuring dimensions of articles useable in such system.

BACKGROUND OF THE INVENTION

Postal rates for mail pieces, e.g. letters, depend on the width, length, thickness and weight of the letters. When a clerk at a window of a post office receives the letter, he or she measures the dimensions with a ruler or a vernier micrometer to determine whether the letter is a standard-size. letter or nonstandard-size letter. Then, the clerk weighs the letter, and selects the postal rate for the letter from the list of rates predetermined on the basis of dimensions and weights.

Manual measurement of dimensions and weight of mail pieces has disadvantages, such as requiring time and labor and also possible errors in measurement. Such problems become obvious when handling a large quantity of mail. It is, therefore, desirous to eliminate such problems.

For sending mail for which postal rates are paid later in a lump sum, a sender sorts mail into standard mail and nonstandard mail, counts the numbers of pieces of standard and nonstandard mail, and writes the numbers down on a slip to be presented to a clerk at a window of the post office.

Standard mail is mail having dimensions, i.e. width, length and thickness within predetermined ranges of values and having weight less than a predetermined value, and nonstandard mail is mail other than the standard mail.

Manual sorting of mail pieces by senders into standard and nonstandard mail, counting the numbers of standard and nonstandard mail pieces and writing the numbers on slips may require a lot of time and labor and involve error.

Therefore, an object of the present invention is to provide a system for classifying articles, such as mail pieces, by automatically measuring their width, length, thickness and weight, and also to provide a dimension measuring apparatus useable in such system.

SUMMARY OF THE INVENTION

An article classifying system according to the present invention includes conveying means for conveying articles. Length measuring means, width measuring means and thickness measuring means measure the length, width and thickness of the articles conveyed by the conveying means, respectively. Weighing means weighs the articles. A plurality of categories are predetermined for articles according to length, width, thickness and weight of articles. Classifying means classifies measured articles into categories according to measurements of the length, width, thickness and weight of the articles.

The classifying means may classify articles as standard articles when the length, width, thickness and weight are within respective predetermined values for length, width, thickness and weight.

The article classifying system may include sorting means for sorting articles into standard and nonstandard articles in accordance with the classification made by the classifying means.

The article classifying system may further include counting means for counting the numbers of articles classified as standard and nonstandard articles by the classifying means, and printing means for printing out the numbers of the standard and nonstandard articles as counted by the counting means.

The article classifying system according to the present invention may further include sender reading means for reading representations of senders indicated on articles, and first calculating means for calculating the numbers of articles for respective senders.

The article classifying system may additionally include addressee reading means for reading representations of addressees indicated on articles, and second calculating means for calculating the numbers of articles for respective addressees.

The article classifying system may include, in addition to the addressee reading means, memory means for storing the addressees on articles as read by the addressee reading means together with the categories, e.g. standard or nonstandard, of such articles as classified by said classifying means.

The articles may be pieces of mail.

An article dimension measuring apparatus according to the present invention can measure the dimensions of an article having outward protruding side surfaces. For that purpose, it includes a light-emitting unit and a light-receiving unit. The light-emitting unit includes a plurality of light-emitters arranged in a measuring direction along the dimension to be measured. The light-receiving unit includes a plurality of light-receivers associated with the light-emitters and arranged along the same direction as the light-emitters. Each of the light-emitters is combined with two or more of light-receivers adjacent to each other to form an emitter-receiver combination. Each light-receiver belongs to two or more such combinations. The apparatus further includes detecting means for detecting whether light emitted by each light-emitter is not intercepted by the article and, therefore, is received by any one of the light-receivers in the emitter-receiver combination to which that light-emitter belongs. Computation means computes the dimension of the article, using the detection result provided by the detecting means, the distance between the light emitting unit and the light-receiving unit, and the distance between the light-emitting unit or light-receiving unit and a reference plane preset so as to pass substantial apexes of the outward protruding side surfaces of the article.

The light-emitters may be arranged along the dimension of articles to be measured, at equal intervals and in substantially the same plane, with the light-receivers arranged along the measuring direction at the same intervals as the light-emitters and in substantially the same plane which is in parallel with the plane in which the light-emitters are arranged. In this case, the distance between the reference plane to the light-emitting unit or to the light-receiving unit is the distance between the light-emitting unit and the light-receiving unit divided by an integer equal to or greater than two.

BRIEF DESCRIPTION OF THE DRAWINGS

FIGS. 5A and 5B illustrate a thickness measuring unit of the article classifying system of FIG. 1, in which FIG. 5A shows the thickness measuring section before it starts measurement and FIG. 5B shows the thickness measuring unit during measurement.

FIG. 7 shows an example of categories into which mail pieces may be classified by the article classifying system.

FIG. 8 illustrates a part of the content of the memory including addressees of mail pieces as classified by the article classifying system.

DETAILED DESCRIPTION OF THE INVENTION

Now, an article classifying system with an article dimension measuring apparatus, according to one embodiment of the present invention, is described in detail with reference to the accompanying drawings.

Figure 1:
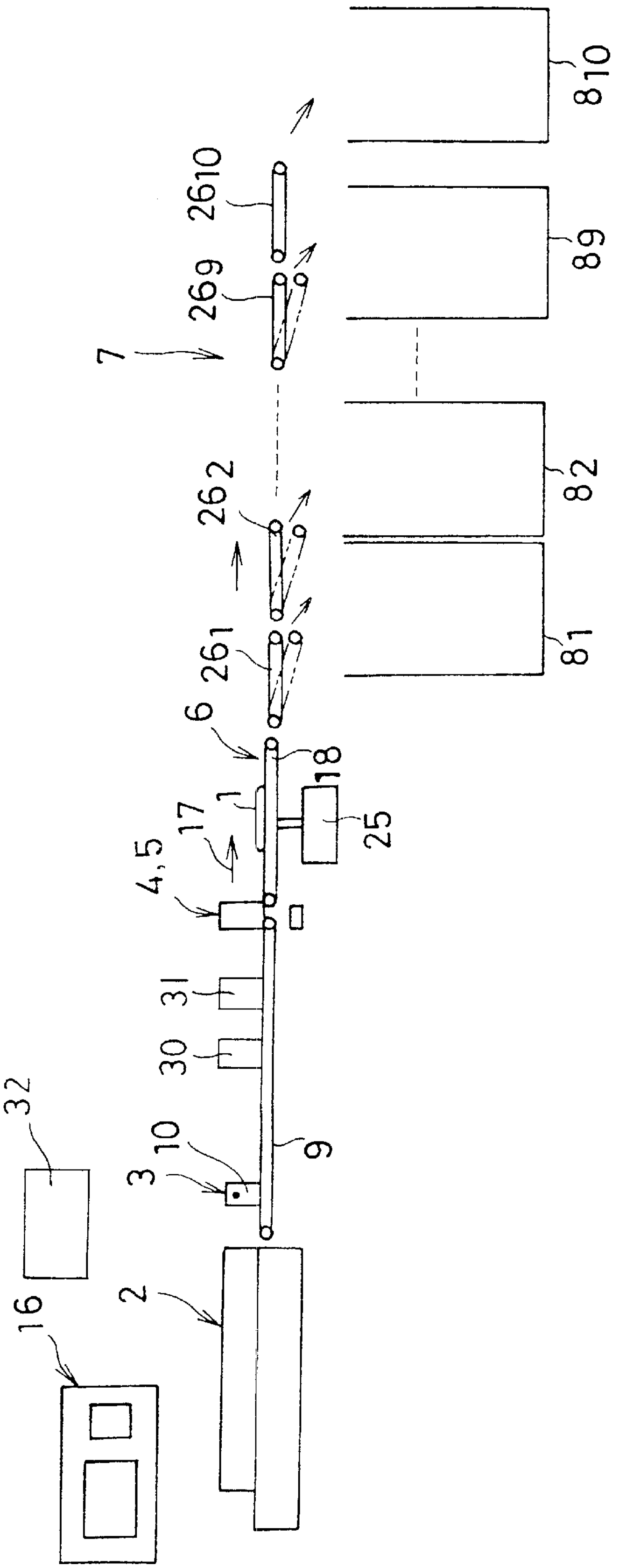
FIG. 1 is a schematic front view illustrating a general structure of an article classifying system according to one embodiment of the present invention.

As shown in FIG. 1, the article classifying system includes a feeder 2 which feeds out pieces of mail 1, e.g. post cards, letters and parcels. They are conveyed on a conveyor 9, and the thickness H, the width Xw, the length L and the weight W of the mail piece 1 fed from the feeder 2 are measured respectively in a thickness measuring unit 3, a width measuring unit 4, a length measuring unit 5 and a weighing unit 6 disposed along the conveyor 9. The mail pieces 1 of which the three dimensions H, Xw and L, and the weight W have been measured are classified into, for example, ten categories according to their three dimensions and weight. A sorter 7 then puts the classified mail pieces into first through tenth containers $8_1$–$8_{10}$ for the respective categories. The ten categories are as shown in FIG. 7. Different postal charges are charged on mail pieces of the respective categories.

An operator visually or mechanically judges sizes of mail pieces 1, puts mail pieces 1 of similar thicknesses on the feeder 2, similarly orienting them on the feeder 2. For example, mail pieces 1 are placed on the feeder 2 so that they can be conveyed on the conveyor 9 with their length aligned in the length direction of the conveyor 9 and with their width direction aligned with the width direction of the conveyor 9. The feeder 2 feeds out successively one by one the mail pieces 1 onto the conveyor 9 at predetermined time intervals.

The operations, such as starting, stopping and speed, of the feeder 2 and the conveyor 9 are controlled through an arithmetic and operation control unit 16, which will be described later, or may be controlled by conventional means.

Figure 5A:
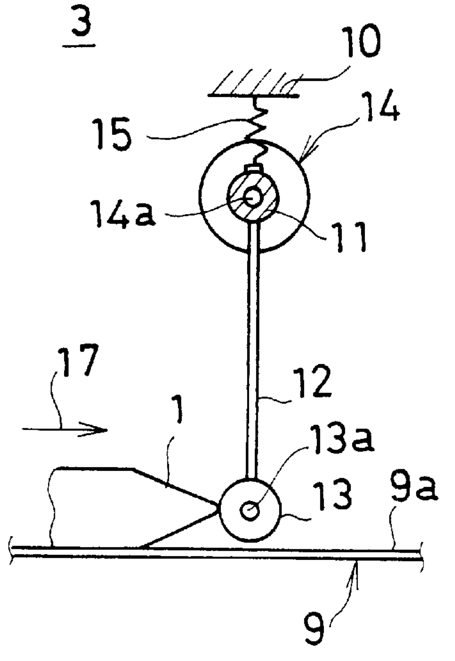
Figure 5B:
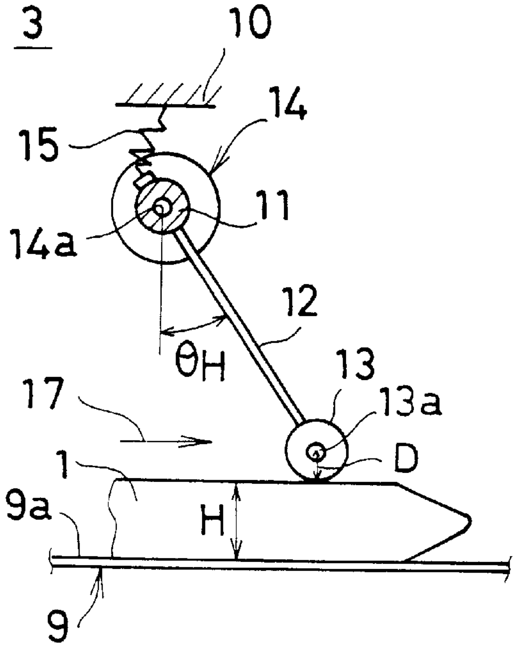

The thickness measuring unit 3 is disposed at a location along the conveyor 9 as shown in FIG. 1, and is mounted on a support frame 10. Referring to FIGS. 5A and 5B, a shaft 11 is rotatably mounted on the support frame 10, and an arm 12 swingable about the shaft 11 is coupled to the shaft 11. A roller is rotatably mounted at the lower end of the arm 12. The shaft 11 is coupled to an input shaft 14*a* of a thickness encoder 14, which, in turn, is mounted on the support frame 10. The shaft 11 is connected to the support frame 10 by a tensioned coil spring 15. The roller 13 can swing about the shaft 11 and, when it is moved from the plumb position it is biased toward the plumb position by its own weight and the spring force provided by the spring 15. In FIG. 5A, the roller 13 is shown in the plumb position. The level at which the roller 13 is positioned is such that it can contact, in the plumb position, a mail piece 1 being conveyed on the conveyor 9 as shown in FIG. 5A. The shaft 11 horizontally extends in the direction orthogonal to the direction in which mail pieces 1 are conveyed on the conveyor 9 and is in parallel with the center axis 13*a* of the roller 13.

The thickness encoder 14 is connected to an arithmetic and operation control unit 16 (FIG. 1). When the roller 13 comes into contact with a mail piece 1 being conveyed by the conveyor 9 and is pushed by the mail piece 1 from the plumb position toward the conveying direction 17 to a position where it comes into contact with the upper surface of the mail piece 1 as shown in FIG. 5B, the thickness encoder 14 detects the angle $\theta_H$ formed between the arm 12 in the plumb position and the arm 12 in the position where the roller 13 is in contact with the upper surface of the mail piece 1. The thickness encoder 14 develops a thickness representative signal representing the detected angle $\theta_H$ and applies it to the arithmetic and operation control unit 16.

The arithmetic and operation control unit 16 achieves arithmetic operations on the thickness representative signal $\theta_H$ received from the thickness encoder 14 according to a program stored in a memory (not shown) to determine the thickness H of the mail piece 1, i.e. the level of the upper surface of the mail piece 1 relative to the conveyor surface 9*a*. It is so arranged that the arithmetic operations for the thickness H are performed in such a manner that any effect of the radius D of the roller 13 on the angle $\theta_H$ can be compensated for. The spring 15 urges the roller 13 onto the upper surface of the mail piece 1 with an appropriate force. Accordingly, accurate computation of the thickness H can be performed. The spring 15 also acts to return the roller 13 to its plumb position as soon as the mail piece 1 has passed the roller 13, for the next thickness measurement.

Figure 2:
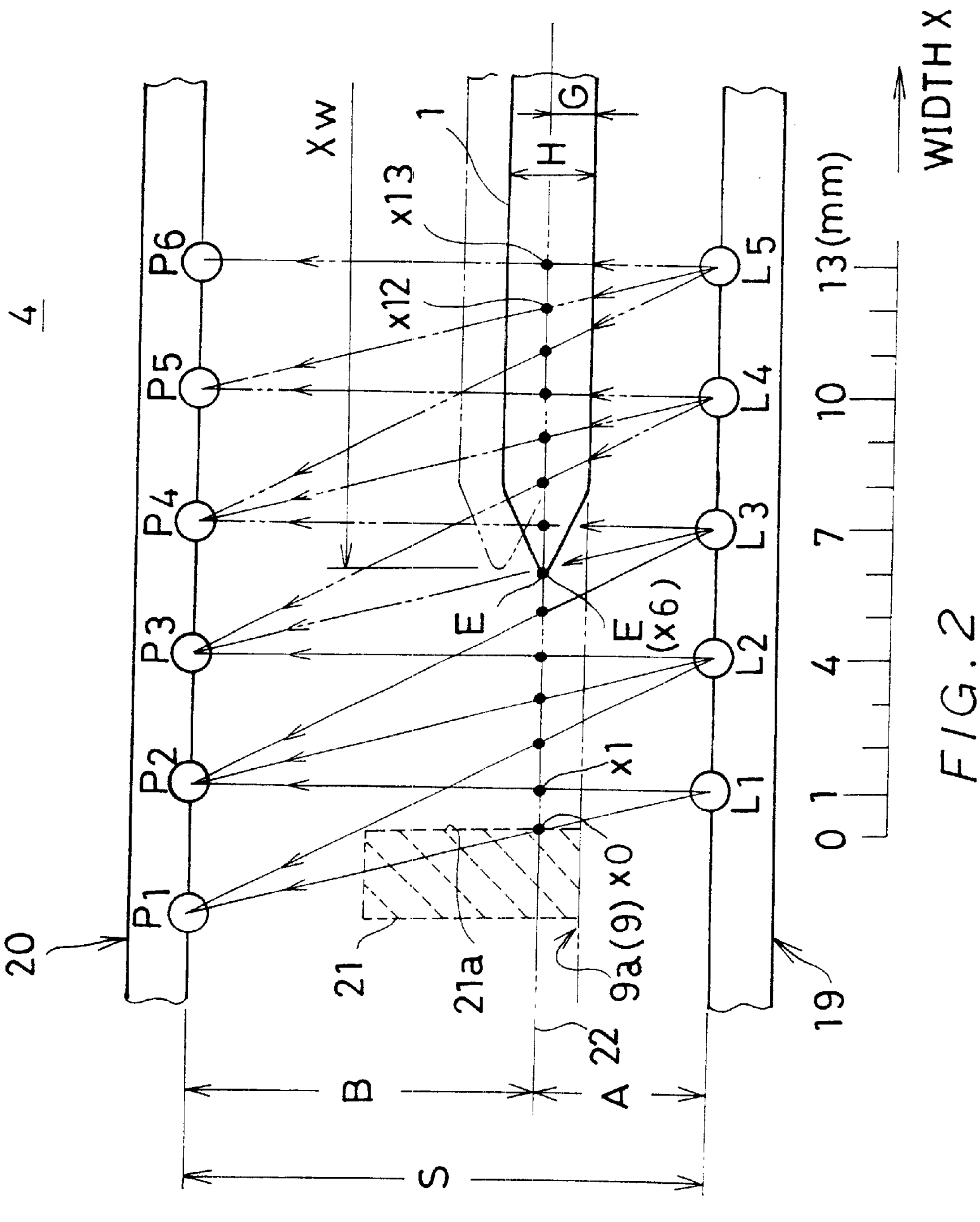
FIG. 2 illustrates how the location of the left end of a mail piece is determined by a width measuring unit of the article classifying system shown in FIG. 1.
Figure 3:
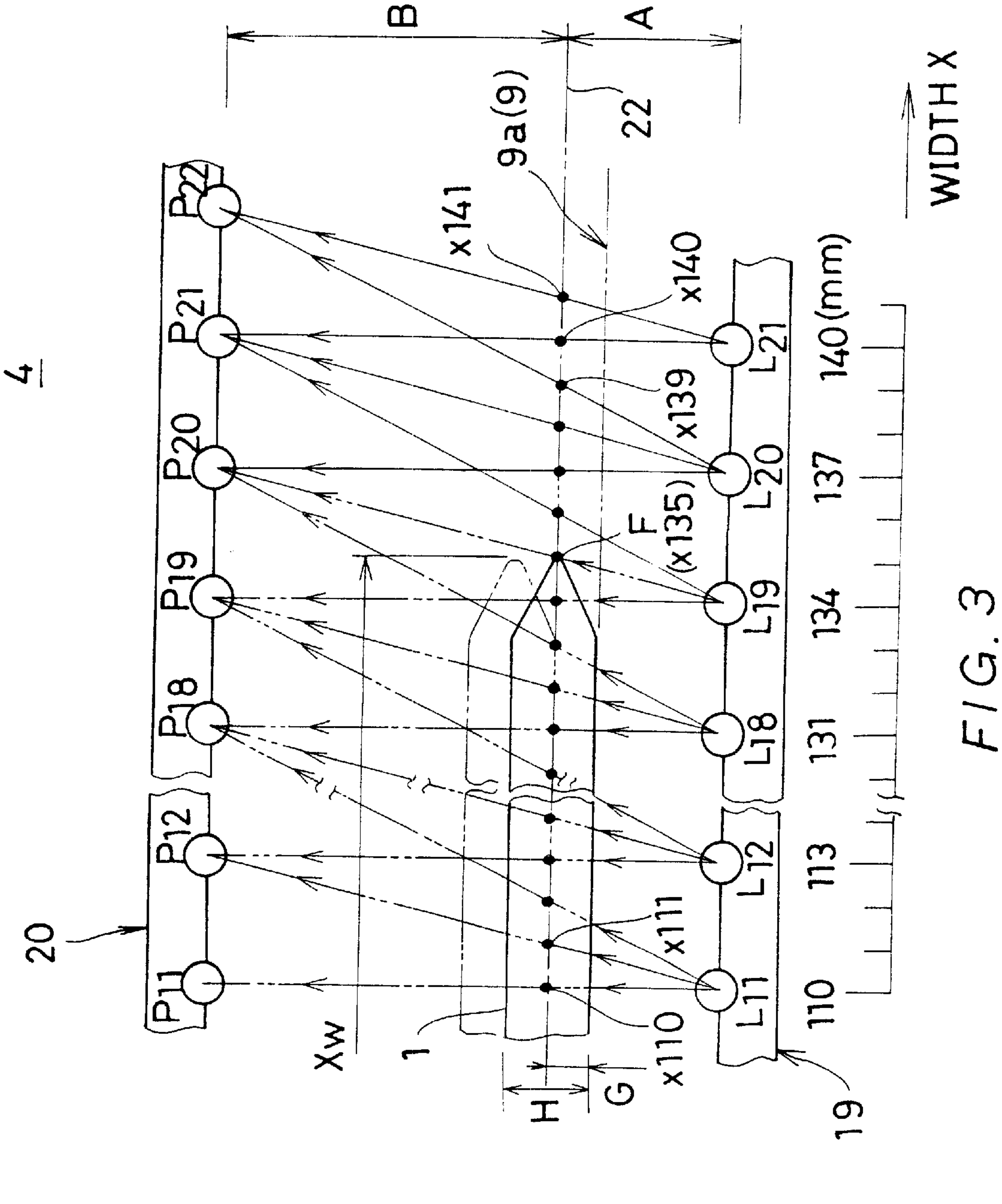
FIG. 3 illustrates how the location of the right end of the mail piece is determined by the width measuring unit of the article classifying system shown in FIG. 1.
Figure 4:
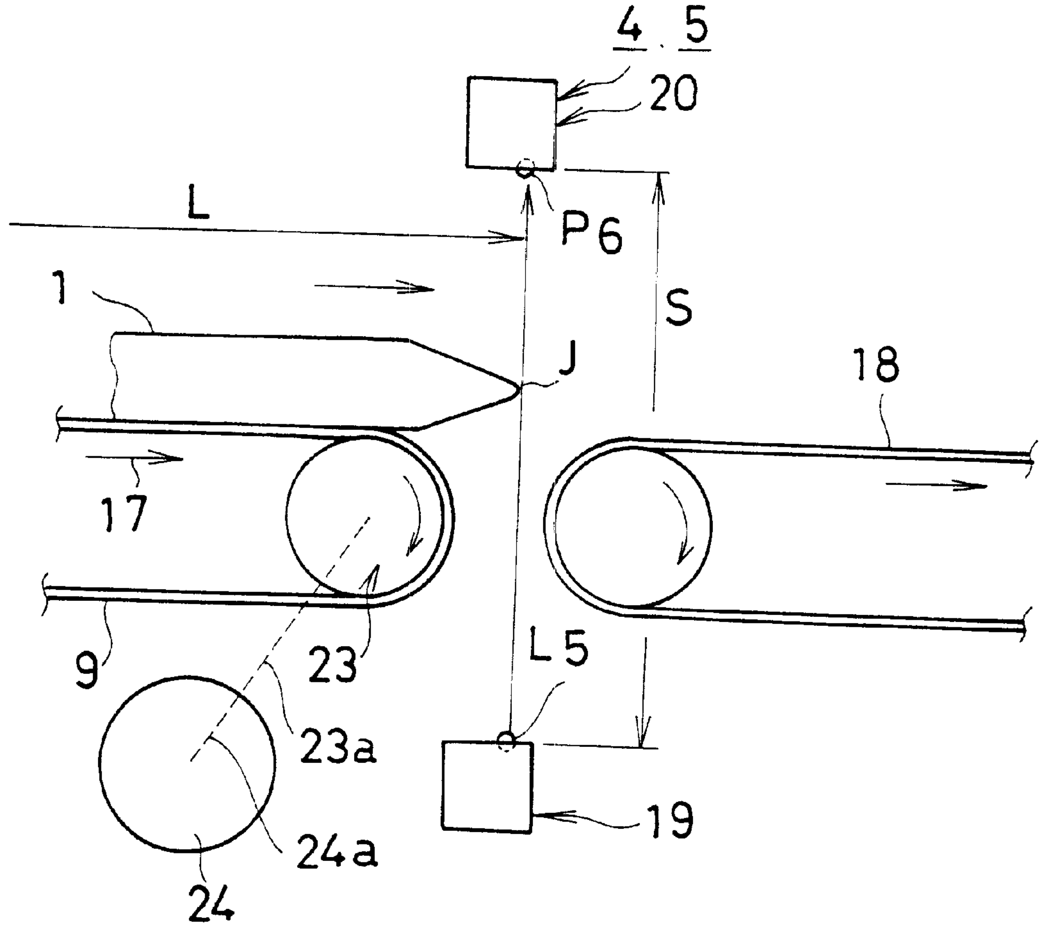
FIG. 4 illustrates how the length of a mail piece is measured by a length measuring unit of the article classifying system shown in FIG. 1.

As shown in FIGS. 2 and 3, a mail piece 1 usually has outward protruding side surfaces having side edges E and F with relatively acute or round apexes. The width of the mail piece 1 is the distance between the side edges E and F, which is measured by the width measuring unit 4. The width measuring unit 4 is disposed between the output end of the conveyor 9 and the input end of a weighing conveyor 18, which will be described in detail later, disposed next to the conveyor 9, as shown in FIGS. 1 and 4. The width measuring unit 4 includes a light-emitting unit 19 disposed at a level below the conveyors 9 and 18, a light-receiving unit 20 disposed at a level above the conveyors 9 and 18, detecting means and computation means. The width measuring unit 4 measures the width Xw of the mail piece 1 conveyed by the conveyor 9. The width Xw is the dimension of the mail piece 1 in the width direction of the conveyor 9.

As shown in FIGS. 2 and 3, the light-emitting unit 19 includes sixteen (16) light-emitters, e.g. light-emitting diodes, $L_1$–$L_5$ and $L_{11}$–$L_{21}$. The light-receiving unit 20 includes eighteen (18) light-receivers, e.g. photodiodes, $P_1$–$P_6$ and $P_{11}$–$P_{22}$. The light-emitters and the light-receivers are connected to the arithmetic and operation control unit 16.

FIG. 2 schematically shows the left-side parts of the light-emitting and light-receiving units 19 and 20 viewed in the conveying direction 17. The units 19 and 20 include the light-emitters $L_1$–$L_5$ and the light-receivers $P_1$–$P_6$ for determining the position of the left side edge E of the mail piece 1 being conveyed on the conveyor 9. FIG. 3 shows a similar view showing the light-emitters $L_{11}$–$L_{21}$, and the light-receivers $P_{11}$–$P_{22}$ for determining the position of the right side edge F of the mail piece 1. Only the light-emitters $L_{11}$–$L_{12}$, and $L_{18}$–$L_{21}$ and the light-receivers $P_{11}$–$P_{12}$ and $P_{18}$–$P_{22}$ are shown, but the light-emitters $L_{13}$–$L_{17}$ and the light-receivers $P_{13}$–$P_{17}$ are not shown.

As shown in FIG. 2, the light-emitters $L_1$–$L_5$ are arranged in a straight line at intervals of, for example, 3 mm in the width direction of the mail piece 1. Also, the light-receivers $P_1$–$P_6$ are arranged in a straight line at the same intervals of 3 mm as the light-emitters $L_1$–$L_5$ along the width direction. The light-receivers $P_2$ through $P_6$ are disposed right above the light-emitters $L_1$ through $L_5$, respectively, while the light-receiver $P_1$ is located diagonally above the light-emitter $L_1$, being shifted leftward from the light-receiver $P_2$.

As shown in FIG. 3, the light-emitters $L_{11}$–$L_{21}$, are arranged in a straight line at the same intervals, i.e. 3 mm, as the light-emitters $L_1$–$L_5$ along the width direction of the mail piece 1, and the light-receivers $P_{11}$–$P_{22}$ are arranged in a straight line at the same intervals of 3 mm as the light-emitters $L_{11}$–$L_{21}$ along the width direction of the mail piece 1. The light-receivers $P_{11}$ through $P_{21}$ are disposed right above the light-emitters $L_{11}$ through $L_{21}$, respectively, with the light-receiver $P_{22}$ disposed diagonally above the light-emitter $L_{21}$ and shifted rightward from the light-receiver $P_{21}$. As is seen from FIGS. 2 and 3, the light-emitter $L_{11}$ is located at a position spaced by 109 mm from the light-emitter $L_1$, in the illustrated example.

An item 21 shown in dashed lines in FIG. 2 is a guide. The guide 21 is fixed on the conveyor 9, being spaced from the width measuring unit 4. The guide 21 defines the leftmost possible position the left side edges of mail pieces 1 on the conveyor 9 could assume. The guide surface 21*a* of the guide 21 for guiding mail pieces is horizontally spaced by 1 mm from the leftmost light-emitter $L_1$.

The width measuring unit 4 with the above-described arrangement can determine the position of the leftmost edge E of the mail piece 1 when the edge E is within a distance range of from 0 mm to 12 mm from the guide surface 21*a,* as shown in FIG. 2, and can determine the position of the rightmost edge F within a distance range of from 110 mm to 140 mm from the guide surface 21*a,* as shown in FIG. 3. In the illustrated example, 1 mm is the minimum detectable unit.

A distance S between the line along which the light-emitter $L_1$–$L_5$ and $L_{11}$–$L_{21}$ are aligned and the line along which the light-receivers $P_1$–$P_6$ and $P_{11}$–$P_{22}$ are aligned is, for example, 120 mm. A distance A of a reference horizontal plane 22 set to pass through the leftmost and rightmost edges E and F of the mail piece 1 from the plane in which the light-emitters are arranged is 40 mm in the illustrated example, which is equal to the distance S of 120 mm divided by 3. Thus, the distance B of the plane 22 to the plane in which the light-receivers are arranged is 80 mm.

The distance G of the horizontal plane 22 from the conveyor surface 9*a* is H/2, where H is an average thickness of mail pieces 1 to be handled which are fed through the feeder 2. In the illustrated example, the average thickness H is set to 20 mm, and, therefore, the distance G is 10 mm. The average thickness H can be varied for handling mail pieces 1 of different thickness. Accordingly, when a different average thickness H is set, the distance G between the horizontal plane 22 passing through the left side edge E and the right side edge F, and the conveyor surface 9*a* changes, and, therefore, if a largely differing thickness H is set, the level of the conveyor surface 9*a* may have to be adjusted so that the distance A can be maintained to be 40 mm which is equal to the distance S=120 mm divided by 3.

Next, the detecting means is described. The detecting means includes programs stored in the arithmetic and operation control unit 16 and the memory.

As shown in FIGS. 2 and 3, each of the light-emitters $L_1$–$L_5$ and $L_{11}$–$L_{21}$ forms a light-emitter-receiver combination with two or three mutually adjacent light-receivers, such as a light-emitter-receiver combination ($L_1$; $P_1$, $P_2$) as indicated by arrowed solid lines connecting the light-emitter $L_1$ to the light-receivers $P_1$ and $P_2$. The light-emitter $L_2$ forms a light-emitter-receiver combination with the light-receivers $P_1$, $P_2$ and $P_3$. Similarly, the light-receivers $L_3$, $L_4$ and $L_5$ for light-emitter-receiver combinations with associated ones of the light-receivers $P_2$–$P_6$ as indicated by arrowed solid and phantom lines in FIG. 2 connecting the light-emitters to the light-receivers.

Similarly, the light-emitter $L_{18}$, for example, forms a light-emitter-receiver combination ($L_{18}$; $P_{18}$, $P_{19}$, $P_{20}$) with the light-receivers $P_{18}$, $P_{19}$ and $P_{20}$, as indicated by arrowed phantom lines connecting the light-emitter $L_{18}$ with the light-receivers $P_{18}$, $P_{19}$ and $P_{20}$ in FIG. 3. Like light-emitter-receiver combinations are formed, as indicated by arrowed solid or phantom lines connecting the respective ones of the light-emitters $L_{11}$–$L_{17}$ and $L_{18}$–$L_{21}$ to two or three of the light-receivers $P_{11}$–$P_{22}$.

Each of the light-receivers $P_2$–$P_{21}$ belongs to three light-emitter-receiver combinations, and each of the light-receivers $P_1$ and $P_{22}$ belongs to two light-emitter-receiver combinations.

The detecting means detects whether light emitted by a light-emitter is received by one or more light-receivers of the light-emitter-receiver combination to which the light-emitter belongs.

The light-emitters $L_1$–$L_5$ and $L_{11}$–$L_{21}$ are enabled successively one by one in the named order. When one light-emitter is enabled, the remaining light-emitters are kept disabled. Whether or not one or more light-receivers in each combination receive light emitted from the light-emitter in the same combination enabled to emit light is determined.

More specifically, first, for detecting the position of the left-side edge E of a mail piece 1, the light-emitters $L_1$–$L_5$ are enabled one by one successively. When it is determined that at least one of the light-receivers of a light-emitter-receiver combination has not received light emitted by the light-emitter belonging to the same combination, the detection of the left-side edge E is terminated. Referring to FIG. 2 as an example, when the light-emitters $L_1$ and $L_2$ are successively enabled to emit light, all of the light-receivers $P_1$ and $P_2$ of the combination to which the light-emitter $L_1$ belongs and all of the light receivers $P_1$, $P_2$ and $P_3$ of the combination to which the light-emitter $L_2$ belongs receive light emitted by the respective light-emitters $L_1$ and $L_2$. However, when the light-emitter $L_3$ emits light, the light-receiver $P_2$ receives the light, but the light-receivers $P_3$ and $P_4$ do not because the passage of the light to them is blocked by the mail piece 1. The succeeding light-emitters $L_4$ and $L_5$ are not enabled, and the detection of the left-side edge E is terminated, and the detection of the right-side edge F of the same mail piece 1 is done.

Next, the light-emitters $L_{11}$–$L_{21}$ are successively enabled one by one to emit light for detection of the right-side edge F. When at least one of the light-receivers belonging to the same light-emitter-receiver combination as the light-emitter being enabled receives light, the detection of the right-side edge F is terminated. For example, referring to FIG. 3, the light-emitter $L_{11}$ is first turned on to emit light, but, since the passage of light is blocked by the mail piece 1, the light is received by none of the light-receivers $P_{11}$, $P_{12}$ and $P_{13}$. Then, the next light-emitter $L_{12}$ alone is turned on to emit light, but the light cannot be received any of the light-receivers $P_{12}$, $P_{13}$ and $P_{14}$. (The light-receivers $P_{13}$ and $P_{14}$ are not shown in FIG. 3.) In the same way, the light-emitters $L_{13}$–$L_{18}$ are successively enabled, but light emitted is received by none of the light-receivers $P_{13}$–$P_{20}$ since the passages of light are blocked by the mail piece 1. When the light-emitter $L_{19}$ is enabled, the light it emits is received by neither of the light-receivers $P_{19}$ and $P_{20}$, but it is received by the light-receiver $P_{21}$. Then, the succeeding light-emitters $L_{20}$ and $L_{21}$are not enabled, but the step for detecting the right-side edge F of the mail piece 1 is terminated. This completes the detection of the locations of the left and right side edges E and F of the mail piece 1.

Next, computation means for computing the width Xw of mail pieces is described. The computation means is formed by predetermined programs stored in the arithmetic and operation control unit 16 and the memory. The computation means computes the width Xw of a mail piece 1 from the results of the detection provided from the detecting means, the distance A and the distance S. As previously described, the distance A is the distance of the plane 22 in which the mail piece edges E and F lie from the plane in which the light-emitting unit 19 is disposed, and the distance S is the spacing between the plane in which the light-emitting unit 19 is disposed and the plane in which the light-receiving unit 20 is disposed.

In the arrangement shown in FIG. 2, A/S=⅓, and the spacing between adjacent ones of the light-emitters $L_1$–$L_5$ and the spacing between adjacent ones of the light-receivers $P_1$–$P_6$ are both 3 mm. The intersections $x_0$, $x_1$, . . . $x_{12}$ and $X_3$ of the light paths from the respective light-emitters $L_1$–$L_5$ to the associated light-receivers $P_1$–$P_6$ and the plane 22 in which the edges E and F of the mail piece 1 lie are at locations 0 mm, 1 mm, . . . , 12 mm and 13 mm, respectively, away from the guide surface 21*a* which is a reference point, which are spaced at intervals of 1 mm.

Similarly, in FIG. 3, the intersections $_{x110}$, $x_{111}$, . . . $x_{140}$ and $x_{141}$ of the light paths from the respective light-emitters $L_{11}$–$L_{21}$ to the associated light-receivers $P_{11}$–$P_{22}$ and the plane 22 are at locations at 110 mm, 111 mm, . . . , 140 mm and 141 mm from the guide surface 21*a*, respectively, which are spaced at intervals of 1 mm.

When the detecting means judges that any of the light-receivers in a light-emitter-receiver combination shown in FIG. 2 is not receiving light from the light-emitter in that combination, the computation means judges one of the intersections, $x_0$, $x_1$, . . . , $x_{12}$ or $x_{13}$, to be the location of the left-side edge E of the mail piece 1. This intersection is the one, i.e. the intersection $x_6$ in the example illustrated in FIG. 2, of the plane 22 and the path connecting the last enabled light-emitter, i.e. the light-emitter $L_3$, and the leftmost one of the light-receivers which have not received light, i.e. the light-receiver $P_3$.

When the detecting means judges that any of the light-receivers in a light-emitter-receiver combination shown in FIG. 3 receives light from the light-emitter in that combination, the computation means judges one of the intersections $_{x110}$, $x_{111}$, . . . , $x_{140}$ and $x_{141}$ to be the position of the right-side edge F of the mail piece 1. This intersection is the one, i.e. the intersection $x_{135}$ in the example illustrated in FIG. 3, of the plane 22 and the path connecting the last enabled light-emitter, i.e. the light-emitter $L_{19}$, and the light-receiver left to the leftmost one of the light-receivers $P_{11}$–$P_{22}$ which has first received light, i.e. the light-receiver $P_{20}$.

The computation means subtracts 6 mm corresponding to the location $x_6$ of the left-side edge E from 135 mm corresponding to the location $x_{135}$ of the right-side edge F of the mail piece 1 to thereby obtain the width of the mail piece 1, Xw, of 129 mm. That is, calculation of (135 mm−6 mm=129 mm) is carried out. In this manner, the width Xw of the mail piece 1 can be measured with a resolution of 1 mm.

The length measuring unit 5 determines the length L of the mail piece 1. Prior to the measurement of the width Xw of the mail piece 1 in the width measuring unit 4, the light-emitter $L_5$ is kept turned on so that it continues to emit light which is received by the light-receiver $P_6$ right above the light-emitter $L_5$. Then, the front edge J of the mail piece 1 interrupts the light from the light-emitter $L_5$ to the light-receiver $P_6$, which is detected by the arithmetic and operation control unit 16. Then, the light-emitters $L_1$–$L_5$ and $L_{11}$–$L_{21}$ are successively turned on to measure the width Xw of the mail piece 1. Immediately after the completion of the measurement of the width Xw, the light-emitter $L_5$ is enabled to emit light and kept enabled. Because of the mail piece 1, the light emitted from the light-emitter $L_5$ does not reach the light-receiver $P_6$. When the rear edge of the mail piece 1 passes the line connecting the light-emitter $L_5$ and the light-receiver $P_6$, the light emitted from the light-emitter $L_5$ begins to be received by the light-receiver $P_6$, again. Thus, the length L can be determined by the arithmetic and operation control unit 16 from the length over which the mail piece 1 is conveyed in a time period of from the time the front edge J has interrupted the light from the light-emitter $L_5$ to the light-receiver $P_6$ until the light-receiver $P_6$ begins to receive the light again.

The light-emitter $L_5$ and the light-receiver $P_6$ are used to measure the length L of mail pieces 1 because they are located closer to the center of the width of the conveyor 9 and, therefore, can detect mail pieces 1 having small width Xw. Accordingly, if necessary, other light-emitter and light-receiver combination, e.g. a combination of the light-emitter $L_4$ and the light-receiver $P_5$, may be used to detect mail pieces 1.

As shown in FIG. 4, a length encoder 24 has its input shaft 24*a* coupled to a support shaft 23*a* of a pulley 23 for rotation with the pulley shaft 23*a*. The conveyor belt of the conveyor 9 is looped around the pulley 23. The length encoder 24 is connected with the arithmetic and operation control unit 16.

The length encoder 24 develops a detection signal $\theta_L$ when the front edge J interrupts the light emitted by the light-emitter $L_5$ and received by the light-receiver $P_6$, and continues to develop it until the mail piece 1 advances to such a point that the light-receiver $P_6$ can receive the light from the light-emitter $L_5$ again. The arithmetic and operation control unit 16 receives the detection signal $\theta_L$ and processes it in accordance with the programs stored in the memory to compute the length L of the mail piece 1.

As shown in FIG. 1, the weighing unit 6 includes the weighing conveyor 18 and a weigher 25, e.g. a load cell unit, disposed to support the weighing conveyor 18. The weigher 25 is connected to the arithmetic and operation control unit 16.

The weighing conveyor 18 is disposed after the conveyor 9. It receives mail pieces 1 conveyed by the conveyor 9 and sends them to the sorter 7 in the succeeding stage. The conveying speed of the weighing conveyor 18 is the same as that of the conveyor 9.

The operation, such as starting, stopping and speed, of the weighing conveyor 18 is also controlled through the arithmetic and operation control unit 16, or may be controlled by conventional means.

The weigher 25 measures the weight W of mail pieces carried on the weighing conveyor 18 and develops a weight signal, which is coupled to the arithmetic and operation control unit 16.

Next, means for classifying mail pieces 1 of which the three dimensions H, Xw and L, and the weight W have been measured, into first through tenth categories is described. The classifying means is formed of predetermined programs stored in the arithmetic and operation control unit 16 and in the memory and classifies the mail pieces 1 according to the three dimensions and weight of the mail pieces 1 as determined in the thickness measuring unit 3, the width measuring unit 4, the length measuring unit 5 and the weighing unit 6. Ten different postal charges are applied to the respective ones of the ten categories.

The ten categories are as shown in FIG. 7. Mail pieces 1 of the first and second categories have a length L of not less than 14 cm and not greater than 23.5 cm, a width Xw of not less than 9 cm and not greater than 12 cm, and a thickness H of not greater than 1 cm. Mail pieces 1 of the first categories have a weight W of not greater than 25 g. The second category mail pieces 1 have a weight W of greater than 25 g and not greater than 50 g. Mail pieces 1 of the first and second categories are "standard" mail, and mail other than the standard mail is "nonstandard mail".

The third through tenth categories are for "nonstandard" mail. A mail piece of the third category has dimensions other than those of the standard mail and has a weight not greater than 50 g. Mail pieces 1 having weight greater than 50 g are classified into appropriate ones of the fourth through tenth categories, regardless of their dimensions. The fourth category is for mail pieces 1 having a weight W of greater than 50 g and not greater than 75 g. The fifth category is for mail pieces 1 having a weight W of greater than 75 g and not greater than 100 g. The sixth, seventh, eighth and ninth categories are for mail pieces having weights W greater than 100 g and not greater than 150 g, greater than 150 g and not greater than 200 g, greater than 200 g and not greater than 250 g, and greater than 250 g and not greater than 500 g, respectively. The tenth category is for mail pieces 1 having a weight W of greater than 500 g.

The sorter 7 automatically sorts or puts mail pieces 1 classified into the ten categories into respective containers $\mathbf{8}_1$ through $\mathbf{8}_{10}$. (Only the containers $\mathbf{8}_1$, $\mathbf{8}_2$, $\mathbf{8}_9$ and $\mathbf{8}_{10}$ are shown in FIG. 1.) The sorter 7 includes first through tenth sorter conveyors $\mathbf{26}_1$ through $\mathbf{26}_{10}$ arranged in the named order one after the other, with the sorter conveyor $\mathbf{26}_1$ following the weighing conveyor 18 and with the conveyor $\mathbf{26}_{10}$ disposed at the end. (Only the sorter conveyors $\mathbf{26}_1$, $\mathbf{26}_2$, $\mathbf{26}_9$ and $\mathbf{26}_{10}$ are shown in FIG. 1.) Mail pieces 1 conveyed by the weighing conveyor 18 are sorted into the first through tenth containers $\mathbf{8}_1$ through $\mathbf{8}_{10}$ by the respective sorter conveyors $\mathbf{26}_1$ through $\mathbf{26}_{10}$. The sorter conveyor $\mathbf{26}_1$ carries mail pieces 1 of the first category into the first container $\mathbf{8}_1$. Similarly, the sorter conveyors $\mathbf{26}_2$ through $\mathbf{26}_{10}$ carry mail pieces of the second through tenth categories into the second through tenth containers $\mathbf{8}_2$ through $\mathbf{8}_{10}$, respectively. For this purpose, the first through ninth sorter conveyors $\mathbf{26}_1$ through $\mathbf{26}_9$ are arranged to move from the horizontal position to the inclined position indicated by phantom lines in FIG. 1 in which the rear ends of the respective sorter conveyors fall by a given amount, and back to the horizontal position.

When a mail piece 1 classified into one category is conveyed to the sorter conveyor for that category, the rear end of that sorter conveyor falls so that the mail piece 1 can be put into the associated container. For example, a mail piece 1 classified as a ninth category mail piece is carried over the first through eighth sorter conveyors $\mathbf{26}_1$ through $\mathbf{26}_8$ and put on the ninth sorter conveyor $\mathbf{26}_9$. Then, the ninth sorter conveyor $\mathbf{26}_9$ is caused to swing down about the front end thereof with an appropriate timing so as to put the mail piece 1 down into the container $\mathbf{8}_9$. Then, the conveyor $\mathbf{26}_9$ returns to the original horizontal position so that it can forward to the tenth sorter conveyor $\mathbf{26}_{10}$, mail pieces 1 of the tenth category conveyed to it to from the sorter conveyor $\mathbf{26}_8$. The tenth sorter conveyor $\mathbf{26}_{10}$ is not arranged to have its rear end fall down, but it simply sends out mail pieces 1 of the tenth category into the tenth container $\mathbf{8}_{10}$.

With the above-described arrangement of the article classifying system, an operator put mail pieces 1 on the feeder 2. The mail pieces 1 are successively fed out onto the conveyor 9 and onto the weighing conveyor 18. While they are conveyed, their thickness H, width Xw, length L and weight W are automatically measured accurately in short time. The measured mail pieces 1, regardless of the number of mail pieces 1 to be handled, are then classified automatically and accurately at high speed into respective categories according to their measured dimensions and weights, and sorted into the corresponding ones of containers $\mathbf{8}_1$ through $\mathbf{8}_{10}$ associated with respective postal charges. Standard mail pieces are put into the containers $\mathbf{8}_1$ and $\mathbf{8}_2$, and nonstandard mail pieces are sorted into the containers $\mathbf{8}_3$ through $\mathbf{8}_{10}$, respectively. Thus, error accompanying manual classification and sorting can by avoided, and troublesome labor and time associated with manual classification and sorting can be eliminated.

Although the spacing between adjacent light-emitters or light-receivers is 3 mm as shown in FIGS. 2 and 3, the width Xw of mail pieces 1 can be measured with a higher resolution of 1 mm. In other words, precise measurement of the width Xw of mail pieces 1 can be realized with a relatively small number of light-emitters and light-receivers.

Because a plurality of light-emitters and light-receivers are arranged at fixed intervals (3 mm in the illustrated example) along the measuring direction (the width direction in the illustrated example) and the distance A (=40 mm in the illustrated example) between the reference plane 22 passing through the two edges E and F of a mail piece 1 and the light-emitting unit 19 is the distance S (=A+B, which is equal to 120 mm in the illustrated example) between the light-emitting unit 19 and the light-receiving unit 20 divided by an integer which is equal to two or larger (three in the illustrated example), the width Xw of mail pieces 1 can be measured in a constant minimum unit amount (=1 mm in the illustrated example).

Now, the reason why the positions of the edges E and F of mail pieces 1 in the horizontal plane 22 at a location spaced by the distance G from the lower surface of the mail piece 1, as shown in FIGS. 2 and 3, are determined is described. In FIG. 2, the conveyor 9 is positioned such that the edges E and F of mail pieces 1 as represented by solid lines can be in the horizontal plane 22 which divides the distance S in a ratio of A:B. With this arrangement, the position of the left-side edge E of the mail piece 1 can be accurately determined to be $x_6$, which is 6 mm from the guide surface 21*a*.

If the conveyor 9 were positioned such that the lower surface of a mail piece 1 as represented by phantom lines in FIG. 2 can be located along the horizontal plane 22, light emitted from the light-emitter $L_3$ would be received by the light-receivers $P_2$ and $P_3$ but would not be received by the light-receiver $P_4$. Thus, a wrong judgement would be made as if the left-side edge E were at $x_7$, which is 7 mm from the guide surface 21*a*.

Similarly, the right-side edge F of the mail piece 1 indicated by solid lines in FIG. 3 can be accurately determined as being at $x_{135}$, which is 135 mm from the guide surface 21*a*. However, if the mail piece 1 were located as indicated by phantom lines, an erroneous judgment as if the right-side edge F were at $x_{134}$, which is 134 mm from the guide surface 21*a*.

As will be understood from the above, the width Xw of the mail piece 1 when it is in the position indicated by solid lines can be accurately measured as being $Xw=x_{135}-x_6=129$ mm, whereas if the mail piece 1 were position in the phantom line position, the width would be judged to be $Xw=x_{134}-x_7=127$ mm, which includes an error of 2 mm.

Thus, the conveyor 9 is positioned such that the left-side and right-side edges E and F of the mail pieces 1 to be handled are located on the horizontal plane 22 for accurate measurement of their width.

The arithmetic and operation control unit 16 may include first and second counters, with a printer 32 connected to the unit 16.

The first counter counts the number of standard mail pieces which have been classified into the first and second categories by the classifying means. The second counter counts the number of nonstandard mail pieces which have been classified into the third through tenth categories by the classifying means.

The printer 32 can print out the numbers of the standard and nonstandard mail pieces counted by the first and second counters, respectively. Accordingly, if it becomes necessary to inform the Post Office of the numbers of standard and nonstandard mail pieces to be posted, a printout can be immediately available.

The arithmetic and operation control unit 16 may be provided with third and fourth counters, with first and second bar code readers 30 and 31 connected to the unit 16.

The first bar code reader 30 is associated with the conveyor 9 and reads sender-representative bar codes on mail pieces 1 being conveyed on the conveyor 9. The second bar code reader 31 is also associated with the conveyor 9 and reads addressee-representative bar codes on mail pieces 1 being conveyed on the conveyor 9.

The third counter counts the number of mail pieces 1 for each of the senders as identified by the first bar code reader 30. The fourth counter counts the number of mail pieces 1 for each of the addressees as identified by the second bar code reader 31.

The number of mail pieces 1 for every sender counted by the third counter and the number of mail pieces 1 for every addressee counted by the fourth counter may be printed out by the printer 32. Any of individuals, companies, departments of companies etc. may be chosen as the senders and addressees.

When the first bar code reader 30 and the third counter are used with the printer 32, an operator can compare the number of mail pieces of each sender as counted and printed on a sheet with the number of mail pieces as actually prepared by that sender to thereby determine whether all the actually prepared mail pieces of each sender have been classified by the classifying system.

If the second bar code reader 31 and the fourth counter are used with the printer 32, the operator can compare the number of mail pieces for each addressee as counted and printed on a sheet with the number of mail pieces as actually addressed to that addressee to thereby determine whether all the actually prepared mail pieces for that addressee have been classified by the classifying system.

In place of bar codes, the senders and the addressees may be represented by OCR characters which an optical character reader (OCR) can read. Such OCR characters representing senders and addressees are read in by an optical scanner. The scanner is disposed in association with the conveyor 9.

The arithmetic and operation control unit 16 performs such processing, in accordance with the predetermined programs, as to store in the memory the addressee of each mail piece I as read by the second bar code reader 31 and its category as classified by the classifying means, together.

FIG. 8 shows the content of the memory including the addressees of eight mail pieces 1 processed by the classifying system according to the present invention, their addresses, dates posted, categories (standard or nonstandard mail), types of special handling (e.g. special delivery, registered mail, etc.) and postal charges. The content may be displayed in this format on a display associated with the arithmetic and operation control unit 16 or may be printed out for checking.

Addresses in the address columns 1 and 2 are pre-stored in the memory in association with the addressees. When the addressees are read in by the second bar code reader 31, the arithmetic and operation control unit 16 calls out the corresponding addresses 1 and 2 and stores them in the memory in association with the addressees.

Types of special handling are indicated on mail pieces 1 together with the addressees, and are read by the second bar code reader 31. The arithmetic and operation control unit 16 causes the types of special handling as read out by the second bar code reader 31 to be stored in the memory in association with their addressees. Mail pieces with no indication of special handling will be treated as ordinary mail.

The arithmetic and operation control unit 16 calculates the postal charge for each mail piece according to the thickness H, width Xw, length L and height W obtained in the above-mentioned manner, and the calculated postal charges are stored in the memory in association with the addresses of the respective mail pieces 1. Postal rates are pre-stored in the memory for various combinations of thickness, width, length and weight of mail pieces, and the arithmetic and operation control unit 16 selects appropriate ones out of prestored postal charges for mail pieces having particular dimensions and weights. Instead of storing “standard mail” or “nonstandard mail” in the memory as the categories of mail pieces, the first through tenth categories may be stored. The number of mail pieces in each of the first through tenth categories may be counted and stored in the memory.

Figure 9:
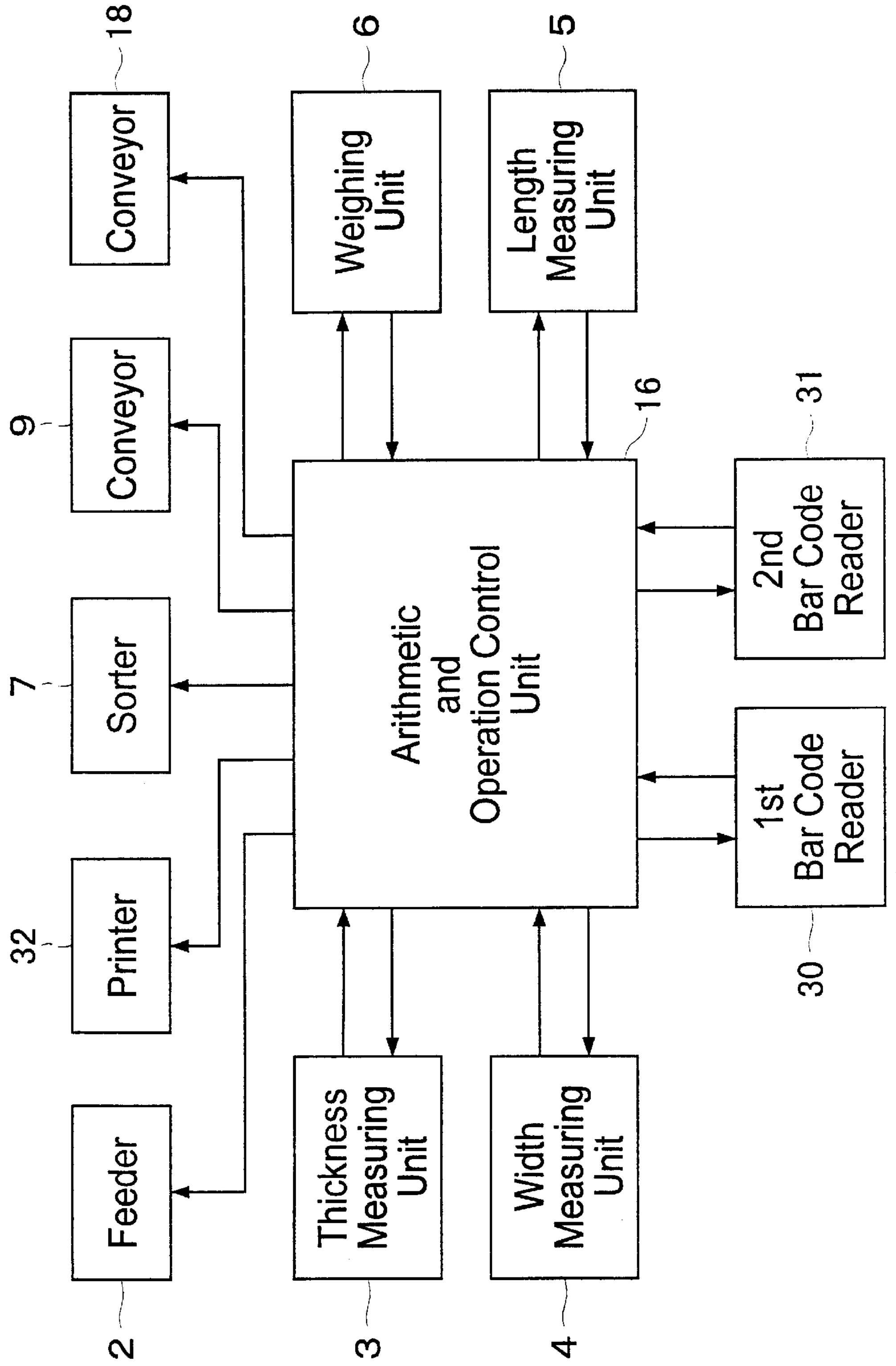
FIG. 9 shows in block the connection of an arithmetic and operation control unit which controls various components of the system according to the present invention.

In FIG. 9, the connections of the arithmetic and operation control unit 16 to the described various components are illustrated.

In the illustrated example, the light-emitters $L_1$–$L_5$ and $L_{11}$–$L_{21}$ and the light-receivers $P_1$–$P_6$ and $P_{11}$–$P_{22}$ are arranged in the width direction at intervals of 3 mm, but they may be spaced at different intervals.

Also, instead of disposing the light-emitting unit 19 below the light-receiving unit 20, it may be placed above the light-receiving unit 20.

Figure 6:
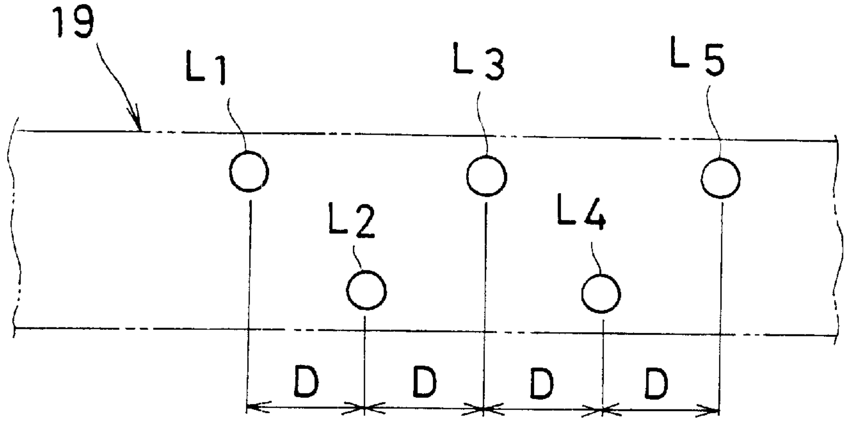
FIG. 6 shows another example of the arrangement of light-emitters in the light-emitting unit used in the classifying system.

In the above-described example, the light-emitters and the light-receivers are arranged on the respective straight lines at equal horizontal intervals of 3 mm. Instead, the light-emitters may be staggered about a line extending in the measuring direction (i.e. the width direction) in the same plane at the same horizontal intervals D, as shown in FIG. 6. In this case, although not shown, the light-receivers are correspondingly staggered at the same horizontal intervals D in the same relationship with the light-emitters as shown in FIGS. 2 and 3.

The distance A of the horizontal plane 22 from the light-emitting unit 19 may be the distance S divided by an integer other than three (3) used in the illustrated example, provided that it is not smaller than two (2). For example, when the distance A is S/4, an additional light-receiver $P_0$ is disposed at a location spaced left by 3 mm from the light-receiver $P_1$ in the arrangement shown in FIG. 2, and another additional light-receiver $P_{23}$ is disposed at a location spaced right by 3 mm from the light-receiver $P_{22}$ in the arrangement shown in FIG. 3. The light-emitter $L_1$ and the light-receivers $P_0$, $P_1$ and $P_2$ form a combination. Each of the light-emitter $L_2$–$L_{21}$ form a combination with four light-receivers which are adjacent to each other. For example, the light-emitter $L_2$ forms a combination with the light-receivers $P_0$, $P_1$, $P_2$ and $P_3$. The light-emitter $L_1$, forms a combination with the light-receivers $P_{11}$, $P_{12}$, $P_{13}$ and $P_{14}$. The last light-emitter $L_{21}$ forms a combination with three light-receivers $P_{21}$, $P_{22}$ and $P_{23}$ Each of the light-receiver $P_1$–$P_{22}$ belongs to four combinations, and each of the light-receivers $P_0$ and $P_{23}$ belongs to three combinations. Light emitted from the light-emitter in a particular combination is directed to the light-receivers in the same particular combination.

In a manner similar to the one explained with reference to the arrangement shown in FIGS. 2 and 3, the width of a mail piece 1 is determined by detecting which ones of the light-receivers cannot receive light from their associated light-emitters. With this arrangement, the width Xw of mail pieces 1 can be measured to a precision of 0.25 mm (=1 mm÷4).

The present invention has been described with reference to an embodiment for classifying pieces of mail, but the classifying system can be used to classify articles other than mail pieces.

Of course, the number of categories into which articles are classified can be other than ten and can be any number equal to or larger than two.

As described above, according to the present invention, thickness, length, width and weight of articles, such as mail pieces, can be accurately measured at high speed, and, then, such articles can be classified accurately into categories at high speed according to their measured dimensions and weights. Also, the numbers of articles of respective categories can be counted, stored in a memory, displayed and/or printed out.

When introducing elements of the present invention or the preferred embodiment thereof, the article “a”, “an”, “the” and “said” are intended to mean that there are one or more of the elements. The terms “comprising”, “including” and “having” are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. An article dimension measuring apparatus for measuring a dimension of an article, comprising:

a light-emitting unit including a plurality of light-emitters arranged in a measuring direction along which a dimension of said article is to be measured;

a light-receiving unit including a plurality of light-receivers arranged in said measuring direction;

each of said light-emitters forming a light-emitter-receiver combination with two or more light-receivers disposed adjacent each other, each of said light-receivers belonging to two or more light-emitter-receiver combinations, light emitted by each of said light-emitters being simultaneously directed to the light-receivers of the light-emitter-receiver combination to which that light-emitter belongs, said article interrupting light directed to at least some of said light-receivers;

a control unit for enabling said light-emitters to emit light one at a time in sequential order so that each of said light-emitters emits light simultaneously toward all of said two or more light-receivers of the light-emitter-receiver combination to which that light-emitter belongs;

detecting means for detecting whether or not light emitted by each light-emitter is being received by all of the said two or more light-receivers of the light-emitter-receiver combination to which that light-emitter belongs; and computation means for computing the dimension of said article from a result of detection made by said detecting means, a first distance between said light-receiving or light-emitting unit and a reference plane preset so as to pass through opposite edges of said article in the measuring direction, and a second distance between said light-emitting unit and said light-receiving unit.

2. The article dimension measuring apparatus according to claim 1 wherein:

said light-emitters are arranged at equal intervals along said measuring direction substantially in a first plane;

said light-receivers are arranged at the same intervals along said measuring direction as said light-emitters substantially in a second plane which is parallel with said first plane; and said first distance is equal to the second distance divided by an integer equal to or greater than two.

3. An article dimension measuring apparatus as set forth in claim 1 wherein the control unit is configured to enable each light-emitter no more than once.

4. An article dimension measuring apparatus as set forth in claim 1 further comprising a guide establishing a reference point for calculation of a distance in said measuring direction between each of said opposite edges of the article and the reference point.

5. An article dimension measuring apparatus as set forth in claim 4 wherein said guide defines a limit to a position of the article in said measuring direction.

6. An article dimension measuring apparatus as set forth in claim 4 wherein said reference point is spaced outwardly from said article in said measuring direction.

7. An article dimension measuring apparatus for measuring a dimension of an article, comprising:

a light-emitting unit including a plurality of light-emitters arranged in a measuring direction along which a dimension of said article is to be measured;

a light-receiving unit including a plurality of light-receivers arranged in said measuring direction;

each of said light-emitters forming a light-emitter-receiver combination with two or more light-receivers disposed adjacent each other, each of said light-receivers belonging to two or more light-emitter-receiver combinations, light emitted by each of said light-emitters being simultaneously directed to the light-receivers of the light-emitter-receiver combination to which that light-emitter belongs, said article interrupting light directed to at least some of said light-receivers;

a control unit for enabling said light-emitters to emit light one at a time in sequential order so that each of said light-emitters emits light simultaneously toward all of said two or more light-receivers of the light-emitter-receiver combination to which that light-emitter belongs;

a detecting system for determining whether or not light emitted by each light-emitter is being received by all of the said two or more light-receivers of the light-emitter-receiver combination to which that light-emitter belongs; and a computing device for computing the dimension of said article from (1) a result of detection made by said detecting system, (2) a first distance between said light-receiving or light-emitting unit and a reference plane preset so as to pass through opposite edges of said article in the measuring direction, and (3) a second distance between said light-emitting unit and said light-receiving unit.

8. The article dimension measuring apparatus according to claim 7 wherein:

said light-emitters are arranged at equal intervals along said measuring direction substantially in a first plane;

said light-receivers are arranged at the same intervals along said measuring direction as said light-emitters substantially in a second plane which is parallel with said first plane; and said first distance is equal to the second distance divided by an integer equal to or greater than two.

9. An article dimension measuring apparatus as set forth in claim 7 wherein the control unit is configured to enable each light-emitter no more than once.

10. An article dimension measuring apparatus as set forth in claim 7 further comprising a guide establishing a reference point for calculation of a dimension in said measuring direction between each of said opposite edges of the article and the reference point.

11. An article dimension measuring apparatus as set forth in claim 10 wherein said guide defines a limit to a position of the article in said measuring direction.

12. An article dimension measuring apparatus as set forth in claim 10 wherein said reference point is spaced outwardly from said article in said measuring direction.

13. An article dimension measuring apparatus for measuring a dimension of an article, comprising:

a first light emitter-receiver unit comprising a plurality of first light emitters equally spaced from each other along a line in a first plane spaced from a reference plane in which one and opposing other ends of said article lie, said plurality of first light-emitters being distributed between a first location on said line spaced outward of said one end of said article and a second location spaced inward of said one end of said article, said first light emitter-receiver unit further comprising a plurality of first light-receivers disposed at locations on the opposite side of said reference plane in such a manner as to face associated ones of said first light-emitters;

each of said first light-emitters emitting light to one of said first light-receivers facing thereto through a first perpendicular light path extending perpendicularly to said reference plane and also to other one of said first light-receivers adjacent to said facing first light-receiver through a first oblique light-path extending to obliquely intersect said reference plane;

the distance of intersections of said first perpendicular and oblique light paths with said reference plane from a first reference point being incremented by a fixed amount, said first reference point being in said reference plane and spaced outward of said one end of said article;

a second light emitter-receiver unit comprising a plurality of second light emitters equally spaced from each other along a line in a second plane spaced from said reference plane, said plurality of second light-emitters being distributed between a third location on said line spaced inward of said other end of said article and a fourth location spaced outward of said other end of said article, said second light emitter-receiver unit further comprising a plurality of second light-receivers disposed at locations on the opposite side of said reference plane in such a manner as to face associated ones of said second light-emitters;

each of said second light-emitters emitting light to one of said second light-receivers facing thereto through a second perpendicular light path extending perpendicularly to said reference plane and also to other one of said second light-receivers adjacent to said facing second light-receiver through a second oblique light-path extending to obliquely intersect said reference plane;

the distance of intersections of said second perpendicular and oblique light paths with said reference plane from a second reference point being incremented by a fixed amount, said second reference point being in said reference plane and spaced inward of said other end of said article and also being spaced from said first reference point by a predetermined distance;

a detecting device for successively causing to emit light from said first light-emitters from the one at said first location to a first one closer to said second location, the light emitted by which is intercepted by said article and, therefore, is not received by at least one of said first light-receivers, and successively causing said second light-emitters from the one at said third location to a first one closer to said fourth location, the light emitted by which is received by at least one of said second; and a computation device for computing a difference in distance from said first reference point between the intersection with said reference plane of the first light path of said intercepted light, and the intersection immediately inward of the intersection with said reference plane of said second light path of the light first received by the at least one of said second light-emitters.

14. The article dimension measuring apparatus according to claim 13 wherein each of said first and second light-emitters emits light along a plurality of oblique light paths which are located between the perpendicular light path associated therewith and the perpendicular light associated with the adjacent light-emitter.

* * * * *